United States Patent [19]

Burgert et al.

[11] Patent Number: 4,950,718

[45] Date of Patent: Aug. 21, 1990

[54] ALLOYS OF VINYLIDENE CHLORIDE INTERPOLYMERS AND OLEFIN POLYMERS

[75] Inventors: Bill E. Burgert, Midland; Dan E. Ranck, Sanford, Mich.

[73] Assignee: The Dow Chemical Company, Midland, Mich.

[21] Appl. No.: 179,789

[22] Filed: Apr. 11, 1988

Related U.S. Application Data

[63] Continuation-in-part of Ser. No. 83,331, Aug. 17, 1987, abandoned, which is a continuation-in-part of Ser. No. 610,716, May 16, 1984, abandoned.

[51] Int. Cl.⁵ .................. C08L 23/08; C08L 27/08; C08L 33/04; C08L 23/02
[52] U.S. Cl. .................. 525/185; 525/194; 525/211; 525/221; 525/222; 525/227; 525/239; 525/192; 525/70
[58] Field of Search .......... 525/239, 221, 227, 185, 525/194, 211, 222

[56] References Cited

U.S. PATENT DOCUMENTS

| | | | |
|---|---|---|---|
| 3,022,263 | 2/1962 | Orthner et al. | 525/239 |
| 3,075,946 | 1/1963 | Zupic | 525/239 |
| 3,085,082 | 4/1963 | Baer et al. | 525/239 |
| 4,102,974 | 7/1978 | Boni | 264/294 |
| 4,613,533 | 4/1986 | Loomis et al. | 525/222 |

*Primary Examiner*—Carman J. Seccuro

[57] ABSTRACT

A compatibilized blend of at least three polymers is provided. One polymer is a vinylidene chloride interpolymer, such as a copolymer of vinylidene chloride and vinyl chloride. A second polymer is an olefin polymer, such as polyethylene. A third polymer is a compatibilizing polymer such as an ethylene/alkyl acrylate or an ethylene/alkyl methacrylate copolymer. The compatibilized blend, after melt processing, has mechanical properties which are better than those predicted by a straight line volume fraction relationship of the vinylidene chloride interpolymer and the olefin polymer.

43 Claims, No Drawings

ALLOYS OF VINYLIDENE CHLORIDE INTERPOLYMERS AND OLEFIN POLYMERS

FIELD OF THE INVENTION

The present application is a continuation-in-part of copending application Ser. No. 083331, filed Aug. 17, 1987: which is a continuation-in-part of our application Ser. No. 610,716 filed May 16, 1984, both now abandoned.

The present invention relates generally to compatibilized blends of at least two normally incompatible polymers. More particularly, the present invention, in one aspect, relates to a polyblend of a vinylidene chloride interpolymer and a graft copolymer. In another aspect, the present invention relates to compatibilized and melt processible blends of a vinylidene chloride interpolymer and an olefin polymer.

BACKGROUND OF THE INVENTION

Vinylidene chloride interpolymers are well known for their excellent barrier to mass transport of atmospheric gases and moisture vapor. These interpolymers have limited areas of application, however, because of poor melt processing characteristics. In particular, vinylidene chloride interpolymers in a melt plasticized state have poor heat stability and low melt strength. These same interpolymers, when fabricated, tend to be brittle and to have low impact strength.

Olefin polymers, such as high density polyethylene, generally have better melt processing characteristics than vinylidene chloride interpolymers. That is, they are melt processible over a wider range of temperatures. The olefin polymers are readily fabricated into articles. They also provide rigidity without brittleness when so fabricated. Notwithstanding such processing advantages, the olefin polymers are excessively permeable to atmospheric gases.

Efforts to combine the best features of vinylidene chloride interpolymers and olefin polymers in a polymer-polymer blend have been unsuccessful. Lack of success has been determined by comparing physical properties of the polymer-polymer blend with those of the blend components in a straight line volume fraction relationship (hereinafter referred to as "the rule of mixtures"). The physical properties of the polymer-polymer blends have generally been poorer than those predicted by following the rule of mixtures.

Various explanations have been advanced to explain the aforementioned lack of success. One such explanation was that mixing procedures used to disperse one polymer in a second polymer were inadequate.

It is now believed that the lack of success may be attributed to inherent physical incompatibility of vinylidene chloride interpolymers with olefin polymers. The lack of success may also be attributed to inadequate adhesion between vinylidene chloride interpolymers and olefin polymers.

SUMMARY OF THE INVENTION

In another aspect, the present invention concerns a polymeric polyblend composition comprising: (a) from about 50 to about 99 weight percent, based on total polymeric blend composition weight, of a vinylidene chloride interpolymer, the interpolymer being formed from a monomer mixture comprising vinylidene chloride in an amount of from about 60 to about 98 percent, based on total weight of monmer mixture, and at least one monoethylenically unsaturated monomer copolymerizable therewith in an amount of from about 40 to about 2 percent, based on total weight of monmer mixture and (b) from 1 to about 50 weight percent, based on total polymeric blend composition weight, of a graft copolymer of comprising a (a) a vinylidene chloride monomer mixture comprising vinylidene chloride in an amount of from about 60 to about 95 percent, based on total weight of monmer mixture, and at least one monoethylenically unsaturated monomer copolymerizable therewith in an amount of from about 40 to about 5 percent, based on total weight of monomer mixture and (b) from about 5 to about 85 weight percent, based on total polymerizable mixture weight, of a preformed polymer, said preformed polymer having at least 10 percent of the vinylidene chloride monomer mixture imbibed therein.

In one aspect, the present invention concerns a compatibilized blend of polymers comprising: (a) a vinylidene chloride interpolymer, the interpolymer having polymerized therein vinylidene chloride in an amount of from about 60 to about 98 percent by weight of interpolymer and at least one monoethylenically unsaturated monomer copolymerizable therewith in an amount of from about 40 to about 2 percent by weight of interpolymer: (b) an olefin polymer and (c) a compatibilizing amount of a compatibilizing polymer, said compatibilizing polymer being selected from the group consisting of (i) ethylene interpolymers having polymerized therein from about 97 to about 60 weight percent of ethylene and from about 3 to about 40 weight percent of at least one oxygen containing species copolymerizable therewith: (ii) halo-substituted olefin polymers having from about 24 to about 44 percent by weight of halogen in the polymer; and (iii) graft copolymers comprising from about 5 to about 85 weight percent of a polyolefin, based on the total polymerizable mixture weight, and a copolymer which comprises a vinylidene halide monomer and an ethylenically unsaturated monomers copolymerizable therewith.

DETAILED DESCRIPTION OF THE INVENTION

Vinylidene chloride interpolymers suitable for use with the present invention are those which have polymerized therein a predetermined amount of vinylidene chloride monomer and also a predetermined amount of monoethylenically unsaturated monomer copolymerizable therewith. The predetermined amounts of copolymers are selected to achieve a desirable oxygen barrier, as described below. The vinylidene chloride interpolymers are also desirably melt processible.

An effective amount of polymerized vinylidene chloride monomer is generally in the range of from about 60 to about 98 percent by weight of interpolymer, with the preferred ranges, as is known to the skilled artisan, dependent upon the monoethylenically unsaturated monomer copolymerized therewith.

The vinylidene chloride interpolymer comprises one or more monoethylenically unsaturated monomers which are copolymerizable with the vinylidene chloride monomer. Monoethylenically unsaturated monomers suitable for copolymerization with vinylidene chloride include vinyl chloride, alkyl acrylates, alkyl methacrylates, acrylic acid, methacrylic acid, itaconic acid, acrylonitrile, and methacrylonitrile. The unsaturated monomers are desirably selected from the group consisting of vinyl chloride, alkyl acrylates and alkyl methacrylates, the alkyl acrylates and alkyl methacrylates having from about 1 to about 8 carbon atoms per alkyl group. The alkyl acrylates and alkyl methacrylates beneficially have from about 1 to about 4 carbon atoms per alkyl group. The alkyl acrylates and alkyl methacrylates are preferably selected from the group consisting of methyl acrylate, ethyl acrylate and methyl methacrylate.

The amount of ethylenically unsaturated comonomer is maintained below an amount sufficient to destroy the semicrystalline character of the interpolymer. By "semicrystalline character" it is meant that the interpolymer has between about 5 percent and about 95 percent crystallinity. Crystallinity values depend upon the measuring technique, and as used herein crystallinity is defined by the commonly used density method. See, for example, the discussion by R. Wessling, in Chapter 6 of *Polvinylidene Chloride*, Vol 5, Gordon and Breach Science Publishers, New York, 1977, the teachings of which are incorporated herein by reference.

The effective amount of monoethylenically unsaturated monomer is generally within the range of from about 40 to about 2 percent by weight of interpolymer. When the monoethylenically unsaturated monomer employed is an alkyl acrylate, the alkyl acrylate will preferably be present in an amount of from about 30 to about 2 percent by weight of interpolymer and the amount of vinylidene chloride is from about 98 to about 70 percent by weight of interpolymer and the amount of vinylidene chloride is from about 90 to about 60 percent by weight of interpolymer.

Olefin polymers suitable for use in the present invention are those olefin homopolymers and interpolymers which can be compatibilized with the vinylidene chloride interpolymers through the use of the compatibilizing polymers of the present invention.

Beneficially, the olefin polymers are selected from the group consisting of (1) low density polyethylene, (2) medium density polyethylene, (3) high density polyethylene, (4) polypropylene, (5) poly 1-butene, (6) generally linear interpolymers of ethylene having polymerized therein from about 2 to about 98 weight percent of ethylene and from about 98 to about 2 weight percent of at least one 1-alkene, said alkene having from 3 to 18 carbon atoms, (7) copolymers of two or more alpha-olefins, having from 3 to 18 carbon atoms per molecule, (8) rubbery ethylene-propylene-diene monomer interpolymers, and mixtures thereof.

Low density polyethylenes which are useful in the present invention have a density of from about 0.917 to about 0.929 grams per cubic centimeter. The low density polyethylenes also have a melt index of from about 0.1 to about 100 grams per 10 minutes as measured in accordance with American Society for Testing and Materials (ASTM) Test D-1238.

Medium density polyethylenes which are useful in the present invention have a density of from about 0.930 to about 0.939 grams per cubic centimeter. The medium density polyethylenes also have a melt index of from about 0.08 to about 100 grams per 10 minutes (ASTM Test D-1238).

High density polyethylenes which are useful in the present invention have a density of from about 0.940 to about 0.965 grams per cubic centimeter. The high density polyethylenes also have a melt index of from about 0.08 to about 100 grams per 10 minutes (ASTM Test D-1238).

For purposes of the present invention, useful polypropylenes are the normally solid isotactic polypropylenes. The isotactic polypropylenes have an insolubility in hot heptane of greater than about 90 percent. These polypropylenes also have a melt flow rate of from about 0.3 to about 35 grams per 10 minutes at a temperature of 230° C. with a load of 2160 grams. The polypropylene beneficially has a melt flow rate of from about 0.3 to about 12 grams per 10 minutes.

Most any poly-1-butene is suitable for use in the percent invention so long as it meets the other requirements for the olefin polymer.

For purposes of the present invention, the linear interpolymers of ethylene have polymerized therein an amount of ethylene and an amount of at least one 1-alkene. The amount of ethylene is suitably from about 2 to about 98 percent, by weight of the interpolymer. The amount of 1-alkene is suitably from about 98 to about 2 percent, by weight of interpolymer.

The 1-alkene is selected from the group of 1-alkenes which have from 3 to about 18 carbon atoms per molecule. The 1-alkene is beneficially selected form the group of 1-alkenes which have from 3 to about 10 carbon atoms per molecule. The 1-alkenes having from 3 to 10 carbon atoms per molecule include propene, butene, hexene and octene.

A beneficial ethylene/1-alkene interpolymer is an ethylene/propylene copolymer. The ethylene/propylene copolymer has polymerized therein ethylene in an amount of up to about 50 percent by weight of copolymer and propylene in an amount of up to about 98 percent by weight of copolymer. The ethylene/propylene copolymer suitably has a melt index of greater than about 0.1 grams per 10 minutes (ASTM D-1238). Desirable results are obtained when the ethylene/propylene copolymer has a melt index of from about 0.4 to about 4.0 grams per 10 minutes (ASTM D-1238). Because polyethylene and polypropylene are both useful materials for purposes of the present invention, it is believed that any ratio of ethylene to propylene in an ethylene/propylene copolymer would also be useful.

Linear copolymers of ethylene and another olefin are described in U.S. Pat. No. 4,076,698, the teaching of which are incorporated herein by reference thereto.

Alpha-olefin interpolymers suitable for use with the present invention have polymerized therein two or more monomers selected from the group of alpha-olefin monomers having from about 3 to about 18 carbon atoms per molecule. The alpha-olefin monomers are represented by the general formula $R-CH=CH_2$ wherein R is an alkyl group of 1 to 16 carbon atoms.

Examples of suitable alpha-olefin monomers include propylene, butene-1, pentene-1, hexene-1, heptene-1, octene-1, nonene-1, decene-1, 4-methyl-pentene-1, 4-methyl-hexene-1 and 4,4-dimethyl-pentene-1.

Rubbery ethylene-propylene-diene monomer interpolymers useful for purposes of the present invention have polymerized therein (a) ethylene in an amount of from about 20 to about 90 percent by weight of interpolymer, (b) propylene in an amount of from about 10 to about 80 percent by weight of interpolymer and (c) a nonconjugated diene in an amount of from about 2 to about 25 percent by weight of interpolymer. Processes for preparing these interpolymers are disclosed in U.S. Pat. Nos. 3,957,919: 3,657,395: and 4,156,767, the teachings of which are incorporated herein by reference thereto.

Examples of suitable nonconjugated dienes include dicyclopentadiene, methyltetrahydroindene, methylene norbornene, ethylidene norbornene, and 1,4hexadiene. Beneficial results are obtained when the nonconjugated diene is either ethylidene norbornene or dicyclopentadiene. Desirably, the nonconjugated diene is dicyclopentadiene and has an iodine value of at least 20.

The rubbery ethylene-propylene-diene monomer interpolymers hereinabove specified suitably have a Mooney viscosity (ML 1+4 at 125° Centigrade) of from about 35 to about 75 beneficially from about 45 to about 65 and a specific gravity of from about 0.86 to about 0.88.

The amount of olefinic polymer is suitably from about 46 to about 1 percent by weight of interpolymer, beneficially from about 30 to about 4 percent by weight of interpolymer, and desirably from about 28 to about 6 percent by weight of interpolymer.

The compatibilizing polymer is selected from the group consisting of (i) ethylene interpolymers having polymerized therein from about 97 to about 60 weight percent of ethylene and from about 3 to about 40 weight percent of at least one oxygen containing species copolymerizable therewith: (ii) olefin polymers having halogen chemically affixed thereto in an amount of from about 24 to about 44 percent by weight of polymer and (iii) graft copolymers comprising from about 5 to about 85 weight percent of a polyolefin, based on the total polymerizable mixture weight, and a copolymer which comprises a vinylidene halide monomer and an ethylenically unsaturated monomers copolymerizable therewith.

The compatibilizing polymer must be capable of compatibilizing a blend of the vinylidene chloride interpolymer and the olefin polymer. For the purposes of this application the blend of vinylidene chloride interpolymer and olefin polymer is considered compatibilized when the blend has mechanical properties which are generally better than those suggested by the rule of mixtures. Specifically, the impact strength of the blend should be better than suggested by the rule of mixtures in order to say the blend is compatibilized. The oxygen permeability of compatibilized blends according to the present invention will have a Dow permeability index of no more than about 2 units, the Dow index being calculated as follows: units are in (cc·mil)/(100 in$^2$·day·atm), wherein cc is the cubic centimeters of oxygen, mil is the sample thickness, in$^2$ is the surface area of the sample, day represents a 24 hour time period, and atm is atmospheric pressure in atmospheres. Beneficially the oxygen permeability of compatibilized blends according to the present invention will be less than about 1.0 Dow unit.

Polymer oxygen permeability is occassionally expressed in an international permeability index calculated as follows: units are (cc·cm)/(cm$^2$·sec·cm of mercury) wherein cubic centimeters of oxygen times centimeters of sample thickness divided by the product of (a) area in square centimeters (b) one second, and (c) barometric pressure in centimeters of mercury. Generally, these units may be calculated by multiplying the oxygen permeability value in (cc·ml)/(100 in$^2$·day·atm) by $6.00 \times 10^{-3}$. Hence a value of 2.0 Dow units is converted to about $0.012 \times 10^{10}$ international units: and 1.0 Dow units is converted to about $0.006 \times 10^{10}$ international units.

Beneficially the compatibilizing polymer will meet two additional criteria. First, it will be melt processible with the vinylidene chloride interpolymer. Second, it will have a melt index or melt viscosity which is sufficiently close to that of the olefin polymer to allow adequate mixing to occur within a reasonable processing time.

In determining whether or not the compatibilizing polymer is melt processible with the vinylidene chloride interpolymer, two factors are of prime importance. The two factors, which are interrelated, are processing time and processing temperature. In melt processing polymers, it is generally recognized that as processing temperatures increase, processing times must decrease in order to avoid undesirable results such as polymer degradation. This is especially true for vinylidene chloride interpolymers.

Vinylidene chloride interpolymers may be melt processed at temperatures of up to about 200° Centigrade provided processing time is less than about one minute. Temperatures greater than about 200° Centigrade may be employed provided the processing time is sufficiently short and provided the vinylidene chloride polymer is not in contact with iron or other metallic elements known to catalyze the degradation of vinylidene chloride interpolymers. For example, vinylidene chloride polymers are melt processible at temperatures as high as about 230° Centigrade at processing times of less than about ten seconds when the vinylidene chloride polymer forms an inner layer in a coextruded structure.

Melt index or melt viscosity differences affect both ease of mixing and mixing times. If the melt index of the compatibilizing polymer is nearly equal to that of the olefin polymer, mixing is generally easy and is accomplished in a relatively short period of time. All other conditions being equal, as melt index disparity increases, mixing times also increase whereas ease of mixing decreases.

The amount of compatabilizing polymer is suitably from about 20 to about 4 percent by weight of interpolymer, beneficially from about 12 to about 6 percent by weight of interpolymer, and desirably from about 10 to about 8 percent by weight of interpolymer.

The first class of compatibilizing polymer, (i), are ethylene interpolymers having polymerized therein from about 97 to about 60 weight percent of ethylene and from about 3 to about 40 weight percent of at least one oxygen containing species copolymerizable therewith. The ethylene interpolymer is suitably selected from the group consisting of (a) ethylene interpolymers having polymerized therein from about 97 to about 60 weight percent of ethylene and from about 3 to about 40 weight percent of at least one ethylenically unsaturated carboxylic acid monomer copolymerizable therewith, the interpolymer being esterified after preparation thereof: (b) copolymers of ethylene and at least one alkyl acrylate (c) copolymers of ethylene at at least one alkyl methacrylate: (d) copolymers of ethylene and carbon monoxide: (e) interpolymers of ethylene carbon monoxide and (1) an ester of an ethylenically unsaturated carboxylic acid or (2) vinyl acetate: (f) copolymers of ethylene and vinyl acetate: (g) ethyl oxazoline modified copolymers of ethylene and acrylic acid: (h) interpolymers of ethylene, carbon monoxide and acrylic acid: (i) interpolymers of ethylene, vinyl acetate and methacrylic acid: and (j) interpolymers of ethylene, carbon monoxide and vinyl acetate. Beneficially, the ethylene interpolymer is either (a), (b), (c), (d), (e), or (f).

Desirable results are obtained when the ethylene interpolymer has polymerized therein from about 97 to about 60 weight percent of ethylene and from 3 to about 40 weight percent of at least one ethylenically unsaturated carboxylic acid monomer copolymerizable therewith, the interpolymer being esterified after preparation thereof.

Suitable ethylenically unsaturated carboxylic acid monomers copolymerizable with ethylene include acrylic acid, methacrylic acid, and the like. Preferably, the unsaturated carboxylic acid monomer is acrylic acid.

Desirable results are also obtained when the ethylene interpolymer is selected from the group consisting of ethylene/alkyl acrylate and ethylene/alkyl methacrylate copolymers wherein the alkyl group contains from 1 to 8 preferably, from 1 to 4 carbon atoms: and ethyl oxazoline modified copolymers of ethylene and acrylic acid.

Ethylene/acrylic acid copolymers are suitably prepared as outlined in U.S. Pat. Nos. 3,520,861 and 4,351,931 the teachings of which are incorporated herein by reference thereto. Methods of esterifying such copolymers are well-known in the prior art.

Preferred ethylene/acrylic acid copolymers, prior to esterification, have polymerized therein acrylic acid in an amount of from about 6 to about 30 percent by weight of the copolymer. The ethylene/acrylic acid copolymers also have a melt index, measured in accordance with American Society for Testing and Materials (ASTM) Test D-1238 of from about 0.01 to about 100 decigrams per minute.

Copolymers of ethylene with either alkyl acrylates or alkyl methacrylates are readily prepared using conventional technology. One process for preparing such copolymers is disclosed in U.S. Pat. No. 2,496,323, the teachings of which are incorporated herein by reference thereto.

Copolymers of ethylene and carbon monoxide are also readily prepared using conventional technology. Processes for preparing ethylene/carbon monoxide copolymers are disclosed in U.S. Pat. Nos. 4,024,325: 4,024,326: and 4,143,096, the teachings of which are incorporated herein by reference thereto.

Ethyl oxazoline modified copolymers of ethylene and acrylic acid are suitably prepared by contacting ethylene/acrylic acid copolymers with an excess of ethyl oxazoline at a temperature of from about 110 to about 120° Centigrade for a period of from about 2 to about 24 hours.

Methods of producing copolymers of ethylene and vinyl acetate: interpolymers of ethylene, carbon monoxide, and acrylic acid: interpolymers of ethylene vinyl acetate and methacrylic acid; interpolymers of ethylene, carbon monoxide, and vinyl acetate: and interpolymers of ethylene, carbon monoxide and an ester of an ethylenically unsaturated carboxylic acid, are well-known in the art and need not be detailed here.

The second class of compatibilizing polymers are olefin polymers having halogen chemically affixed thereto in an amount of from about 24 to about 44 percent by weight of polymer. Olefin polymers having halogen chemically affixed thereto suitably have chlorine as the halogen.

The term "olefin polymer" is meant to include olefin homopolymers and olefin interpolymers. Suitable olefin polymer are formed from one or more olefin monomers having from 2 to about 18 carbon atoms.

Beneficial compatibilizing olefin polymers include olefin homopolymers formed from a mono-olefin monomer having from 2 to 4 carbon atoms. Exemplary of such olefin homopolymers are polyethylene, polypropylene and polybutylene. Preferred olefin homopolymers are the polyethylene resins. The olefin homopolymers have halogen chemically affixed thereto.

Beneficial compatibilizing olefin polymers also include olefin interpolymers formed from at least one mono-olefin monomer having from 2 to 4 carbon atoms and up to 98 weight percent of at least on 1-alkene monomer having from 4 to 18 carbon atoms. A preferred group of olefin interpolymers contain at least about 90 mole percent of ethylene and about 10 mole percent of at least one 1-alkene having from 4 to 18 carbon atoms. Exemplary of suitable 1-alkenes are butene-1, octene, 1,7-octadiene and the like. Another preferred olefin interpolymer comprises 2 mono-olefin monomers having from 2 to 4 carbon atoms. Exemplary of such interpolymers are interpolymers of ethylene and propylene. The olefin interpolymers have halogen chemically affixed thereto.

The compatibilizing olefin polymers having chlorine as the halogen chemically affixed thereto suitably have a chemically combined chlorine content of from about 24 to about 44 percent by weight of polymer. The resins also have a heat fusion of from about 2 to about 13 calories per gram and a melt viscosity of from about 8,000 to about 20,000 poise. Melt viscosity is determined using a capillary rheometer at a temperature of 190° Centigrade, a shear rate of 245 reciprocal seconds and a capillary size of 0.127 by 5.08 centimeters.

The compatibilizing olefin polymers, prior to chlorination, suitably have a weight average molecular weight of less than about 1,000,000 grams per mole, beneficially between about 20,000 and 300,000 grams per mole.

The compatibilizing olefin polymers are suitably prepared under the influence of catalyst systems comprising admixtures of strong reducing agents, such as triethyl aluminum, and compounds of groups IV-B, V-B, and VI-b metals of the Periodic System, such as titanium tetra-chloride, and the like.

Desirable compatibilizing olefin polymers are the chlorinated polyethylenes. Chlorinated polyethylene resins desirable for use with the present invention are prepared by suspension chlorination as disclosed in U.S. Pat. No. 3,454,544, the teachings of which are incorporated herein by reference thereto.

The present invention is not restricted to chlorinated polyethylene resins prepared by suspension or slurry chlorination processes. Solution chlorination and bulk, or fluidized bed, chlorination procedures may also be used provided the interpolymers produced thereby meet the aforementioned requirements with regard to chlorine content, heat of fusion and melt viscosity.

The third class of compatabilizing polymers are graft copolymers comprising (a) from about 5 to about 85 weight percent, based on total polymerizable mixture weight, of a preformed polyolefin, and (b) a copolymer comprising vinylidene chloride and at least one monoethylenically unsaturated monomer. See, for example, copending U.S. patent application Ser. No. 024,445, filed Mar. 11, 1987, in the name of Yun Sun, the teachings of which are incorporated herein by reference. Generally, the patent application teaches a compatabilizing graft copolymer and method for making, the steps of the method comprising (A) forming a polymerizable mixture comprising: (1) a copolymer comprising vinylidene chloride and a monoethylenically unsaturated monomer; and (2) from about 5 to about 85 weight percent, based on total polymerizable mixture weight, of a preformed polyolefin, said preformed polyolefin being capable of imbibing said monomer mixture; (B) allowing the preformed polyolefin to contact the monomer mixture for a length of time and at a temperature such that the vinylidene chloride monomer mixture is imbibed in an amount sufficient such that during polymerization an effective amount of the vinylidene chloride monomer mixture, based on total monomer mixture weight, will be uniformly grafted to the preformed polyolefin: and (C) polymerizing the polymerizable mixture to form a polymeric composition.

The monomer mixture comprises a vinylidene halide monomer in an amount of from about 60 to about 98 weight percent, desirably from about 65 to about 96 weight percent, and preferably from about 70 to about 94 weight percent, based on total monomer mixture weight.

The ethylenically unsaturated monomer or monomers copolymerizable with the vinylidene halide monomer are present in the monomer mixture in an amount of from about 2 to about 40 weight percent, desirably from about 4 to about 35 weight percent, and preferably from about 6 to about 30 weight percent based on total monomer mixture weight.

The polymerizable mixture also comprises from about 5 to about 85 weight percent, based on total polymerizable mixture weight, of a preformed polymer. The preformed polymer is capable of imbibing at least a portion of the monomer mixture.

Suitable polymers for use as the preformed polymer include those polymeric compositions which are capable of imbibing the monomer mixture without dissolving therein. Exemplary of suitable polymers are the olefin polymers and derivatives thereof, The compatibilized blends of the present invention are readily prepared by using conventional melt processing techniques provided two conditions are met. First, melt processing must be accomplished at a temperature below that at which decomposition of the vinylidene chloride interpolymer becomes significant. Second, sufficient shear must be generated during melt processing to provide a visually homogeneous blend with a reasonable mixing time.

One factor in determining satisfactory mixing times is the melt index of the components of the compatibilized blend. If component melt indexes are nearly equal, a relatively short mixing time yields satisfactory results. If there is a disparity among component melt indexes, a longer mixing time is necessary.

A second factor in determining satisfactory mixing times is mixing shear rate. All other parameters being equal, a relatively low shear rate is needed when the components have a relatively low viscosity or a high melt index. Conversely, a relatively high shear rate is needed when the components have a relatively high viscosity or a low melt index. By way of example, only, a blend comprising a high melt index low density polyethylene requires a much shorter mixing time than a blend comprising a low melt index high density polyethylene.

A third factor in determining satisfactory mixing times is temperature. As noted hereinbefore, an upper limit on temperature is the temperature at which decomposition of the vinylidene chloride interpolymer becomes significant. A lower limit on temperature is dictated by the polymer blend component which has the greatest melting point. If the temperature does not exceed the melting point of that polymer blend component, a visually homogeneous melt will be difficult, if not impossible, to obtain.

A fourth factor in determining satisfactory mixing times is mixing efficiency of the melt processing equipment. Certain melt processing equipment mixes more efficiently than other melt processing equipment. Selection of melt processing equipment which will produce a visually homogeneous melt within a reasonable processing time is, however, not difficult and can be accomplished without undue experimentation.

A fifth factor in determining satisfactory mixing times is polymer feed form. The polymeric components of the compatible blends are generally available either in finely divided powder form or in pellet form. Either form is suitable for purposes of the present invention. The pellet form, if available, is preferred over the powder form.

Exemplary melt processing equipment includes heated two roll compounding mills, Brabender mixers, Banbury mixers, single screw extruders, twin screw extruders, and the like, which are constructed for use with thermally sensitive polymers. See, for example, the discussion by R. Wessling, in Chapter 11 of *Polyvinylidene Chloride*, Vol 5, Gordon and Breach Science Publishers, New York, 1977, the teachings of which are incorporated herein by reference. Desirable results are obtained when an extruder, either single screw or twin screw, is used for melt processing the components of the polymeric composition.

A variety of additives may be added to the compatibilized blends of the present invention. Additive type and amount thereof will depend upon several factors. One factor is the intended use of the blends. A second factor is tolerance of the blends for the additives. That is, how much additive can be added before physical properties of the blends are adversely affected to an unacceptable level. Other factors are apparent to those skilled in the art of polymer formulation and compounding.

Additives which may be incorporated into the compatibilized blends of the present invention are selected from the group consisting of plasticizers, heat stabilizers, light stabilizers, pigments, processing aids, lubricants and the like. Each of these additives is known and several types of each are commercially available.

The compatibilized blends can be used to form a variety of cast, blown, extruded, molded, injection molded, blow molded, or calendered articles. Physical properties of the blends depend largely upon two factors. One factor is selection of the polymer component of the compatibilized blends. A second factor is the ratio of polymer components to each other within said compatibilized blends.

The present invention is illustrated in further detail by the following examples and comparative examples. The examples and comparative examples are for purposes of illustration only and are not to be construed as limiting the scope of the present invention. All parts and percentages are by weight unless otherwise specifically noted.

Blend Preparation

Three polymeric components (a) a vinylidene chloride interpolymer, (b) an olefin polymer and (c) a compatibilizing polymer, each of which was in pellet form, were dry blended to form a visually uniform admixture. Blending was accomplished by placing the components in a bag and then shaking them. More sophisticated equipment could have been used but was not necessary. The admixture was then fed to an extruder via a rate controlled feeding mechanism. Each of the polymeric components used in the examples and comparative examples is described hereinafter at Table I.

Melt blending of the admixture was accomplished in two stages using one of two extruders. One extruder, hereinafter designated as "Extruder A", was a 1.90 centimeter single screw Brabender extruder. Extruder A had a length to diameter ratio of 20:1. It had the following set temperatures: (a) hopper temperature=160° Centigrade: (b) melt zone temperature=165° Centigrade: and (c) die temperature=170° Centigrade. A second extruder, hereinafter designated as "Extruder B", was a 5.08 centimeter single screw Hartig extruder. Extruder B had a length to diameter ratio of 12:1. It had the following set temperatures: (a) hopper temperature=165° Centigrade: (b) melt zone temperature =170° Centigrade: and (c) die temperature=175° Centigrade.

In a first stage, the admixture was added to the extruder hopper and thereafter converted to a molten blend. The molten blend, or preliminary blend, was extruded through a single strand die, passed through a water bath, and then pelletized. The strand die had an internal diameter of 0.32 centimeter. Pelletizing was accomplished using a Model 304, 15.24 centimeter strand cutter commercially available from Conair Incorporated.

In a second stage, which was used to promote complete mixing, a tape die was substituted for the strand die. The pelletized preliminary blend was added to the extruder hopper and thereafter converted to a molten blend. This molten blend was extruded through the tape die to form a tape having a width of about 5.08 centimeters and a thickness of about 0.42 centimeters. The tape was cut, directly from the tape die using a pair of scissors, into strips having a length of from about 20 to about 26 centimeters. The strips were laid on a clean smooth surface to cool. The surface used was chrome plated steel. Other surfaces known to those skilled in the art could also have been used.

Impact Tests

With the exception of the blends set forth in Table II-L, the impact strength of the blends is tested as set forth below. The impact strength of the blends described in Table II-L are measured according to American Society of Testing and Materials Test Method D-256, method A. Notched Izod Impact Strength measures the toughness of the sample, which contana notch, in foot pounds per inch notch.

Compression Molding to Prepare Impact Test Specimens

A stainless steel template measuring 16.5 centimeters by 16.5 centimeters by 0.16 centimeters was used to prepare a sample sheet from which impact test samples were cut. A "sandwich" was created by (a) placing the template on a sheet of polyester film having a thickness of about 0.009 centimeter, (b) placing about 65 grams of the strips side-by-side in the template, and (c) covering the template and strips with a second sheet of polyester film.

The sandwich was placed into a compression molding press. It was first processed for a period of one minute at a temperature of 175°-180° Centigrade and at a force of about 909 kilograms. The sandwich was then processed for an additional period of two minutes at the same temperature but at a force of about 15,909 kilograms. After the additional period, the sandwich was allowed to cool to a temperature of about 25° Centigrade before being removed from the press. The sample sheet was then separated from the sandwich.

Instrumented Puncture Impact test specimens were prepared by using a band saw to cut the sample sheet into square pieces measuring 5.08 centimeters on a side. The test specimens were then annealed, conditioned and subjected to impact testing as hereinafter detailed.

Test Specimen Annealing

The impact test specimens were annealed by being subjected to a set temperature of about 60° Centigrade for a period of 16 hours in a convection air oven. The oven was commercially available from Precision Scientific, Incorporated under the trade designation Model 625.

Impact Test Specimen Conditioning

After being annealed, the impact test specimens were further conditioned prior to impact testing. Further conditioning was accomplished in a controlled humidity room having a relative humidity of 50±5 percent and a temperature of 23°±2° Centigrade for a period of 24 hours.

Instrumented Puncture Impact Testing

Impact testing was done with a High Rate Impact Tester commercially available from Rheometrics, Incorporated under the trade designation RIT-8000. Specimens were tested at a temperature of 23°±2° Centigrade with a ram speed of 20,320 centimeters per minute.

Compression Molding to Prepare Oxygen Permeability Test Specimens

Permeability test specimens having a thickness of from about 0.013 to about 0.018 centimeters were prepared by using a modification of the procedure set forth hereinabove with respect to preparation of impact test specimens. The procedure was modified by eliminating the stainless steel template so that the strips were placed between the two sheets of polyester film to form the sandwich. After compression molding, permeability test specimens were cut from the sheet using a pair of scissors.

The test specimens were annealed using the procedure set forth hereinabove with respect to the impact test specimens.

Oxygen Permeability Testing

Oxygen permeability of the compression molded samples was measured using an instrument commercially available from Modern Controls, Incorporated, under the trade designation Oxtran 1050. Oxygen permeability measurements were made at 40°, 50° and 60° Centigrade and then extrapolated to 25° Centigrade.

Temperature dependence of permeability is known to be represented by an equation of the form $P = P_o$ raised to the exponent of $(-E_a/RT)$ where P = permeability
$P_o$ = a constant $E_a$ = activation energy of permation
R = gas constant
T = absolute temperature From the equation, it is apparent that permeability increases rapidly with increasing temperature. Accordingly, an Arrhenius plot at several elevated temperatures (log P vs 1/T, wherein P and T are as identified hereinabove) can be used to extrapolate to permeabilities at lower temperatures. Extrapolation is valid so long as there is no transition over the range of temperatures selected for taking measurements.

Those skilled in the art recognize that oxygen permeability values obtained from compression molded samples may vary from the values obtained by testing samples prepared in a different manner. Compression molded sample data is, however, a valid basis for comparison.

Polymers used in preparing polymer blends of the examples and comparative examples are set forth hereinafter in Table I.

TABLE I

| Code | Polymer Components — Polymer Description |
|---|---|
| VDC-1 | A vinylidene chloride copolymer polymerized from a monomer mixture containing about 80 percent vinylidene chloride and about 20 percent vinyl chloride, both percentages being based upon copolymer weight. The copolymer had a melt point of about 161° Centigrade and a weight average molecular weight of about 90,000 grams per mole. The copolymer was commercially available from The Dow Chemical Company. |
| VDC-2 | A vinylidene chloride copolymer polymerized from a monomer mixture containing about 80 percent vinylidene chloride and about 20 percent vinyl chloride, both percentages being based upon copolymer weight. The copolymer had a melt point of about 161° Centigrade and a weight average molecular weight of about 110,000 grams per mole. The copolymer was commercially available from The Dow Chemical Company. |
| VDC-3 | A vinylidene chloride copolymer polymerized from a monomer mixture containing 85 percent vinylidene chloride and about 15 percent vinyl chloride, both percentages being based upon copolymer weight. The copolymer had a melt point of about 172° Centigrade and a weight average molecular weight of about 100,000 grams per mole. The copolymer was commercially available from The Dow Chemical Company. |
| VDC-4 | A vinylidene chloride copolymer polymerized from a monomer mixture containing 85 percent vinylidene chloride and about 15 percent vinyl chloride, both percentages being based upon copolymer weight. The copolymer had a melt point of about 172° Centigrade and a weight average molecular weight of about 70,000 grams per mole. The copolymer was commercially available from The Dow Chemical Company. |
| VDC-5 | A vinylidene chloride copolymer polymerized from a monomer mixture containing about 72 percent vinylidene chloride and about 28 percent vinyl chloride, both percentages being based upon copolymer weight. The copolymer had a melt point of about 140° Centigrade and a weight average molecular weight of about 130,000 grams per mole. The copolymer was commercially available from The Dow Chemical Company. |
| VDC-6 | A vinylidene chloride copolymer polymerized from a monomer mixture containing about 94 percent vinylidene chloride and about 6 percent methyl acrylate, both percentages being based upon copolymer weight. The copolymer had a melt point of about 160° Centigrade and a weight average molecular weight of about 120,000 grams per mole. The copolymer was commercially available from The Dow Chemical Company. |
| VDC-7 | A vinylidene chloride copolymer polymerized from a monomer mixture containing about 83 percent vinylidene chloride and about 17 percent vinyl chloride, both percentages being based upon copolymer weight. The copolymer had a melt point of about _° Centigrade and a weight average molecular weight of about _ grams per mole. The copolymer was commercially available from The Dow Chemical Company. |
| VDC-8 | A vinylidene chloride copolymer polymerized from a monomer mixture about 94 percent vinylidene chloride and about 6 percent methyl acrylate, both percentages being based upon copolymer weight. The copolymer had a melt point of about 164° Centigrade and a weight average molecular weight of about 90,000 grams per mole. The copolymer was commercially available from The Dow Chemical Company. |
| PVDC/ LDPE | The compatibilizing graft copolymers are prepared in the following manner. Into a ten gallon stirred polymerization reactor is loaded 2850 grams of a low density polyethylene resin commercially available from The Dow Chemical Company under the trade designation PE-641 (described below under LDPE). To the polyethylene in the reactor is added 13,000 grams of demineralized water, 0.6 grams of di-tert-butylmethylphenol; 40.0 grams of tertiary butyl peroctoate, 6150 grams of vinylidene chloride, 1500 grams of vinyl chloride, 76.0 grams of epoxidized linseed oil and 17.0 grams of Methocel ®KHM brand cellulose ether as a suspending agent. The reactor is sealed, purged with nitrogen and elevated to a temperature of about 25° C. After polymerization has begun, the temperature is raised to 80° C. and polymerization is allowed to continue for about 16 hours. The resultant polymeric material is vacuum stripped and recovered. |
| PVDC/ PP | The procedures employed to make the PVDC/ LDPE graft copolymer are repeated with the exception that the polyethylene resin is replaced with a polypropylene resin. The polypropylene resin (described below under PP) is commercially available from Himont USA, Inc. under the trade designation Himont PP S-B-751. |
| LDPE | A low density polyethylene resin having a density, determined in accordance with American Society for Testing and Materials (ASTM) Test D-792, of 0.92 grams per cubic centimeter and a melt index (ASTM Test D-1238) of 2 decigrams per minute. The resin was commercially available from The Dow Chemical Company under the trade designation PE 641. |
| HDPE | A high density polyethylene resin having a density (ASTM Test D-1505) of 0.965 grams per cubic centimeter and a melt index, (ASTM Test D-1238) of 0.8 decigrams per minute. The resin was commercially available from The Dow Chemical Company under the trade designation HDPE 12065. |
| PP-1 | A polypropylene resin having a density of 0.902 grams per cubic centimeter (ASTM Test D-792 A-2) and a melt flow rate of 0.4 grams per ten minutes (ASTM Test D-1238). The resin was commercially available from Hercules Incorporated under the trade designation Pro-Fax ™ 6823. |
| PB | A polybutylene resin having a density of 0.895 grams per cubic centimeter (ASTM Test D-792) and a melt index of 2.0 grams per ten minutes (ASTM Test D-1238). The resin was commercially available from Shell Chemical Company under the trade designation WBS-085. |

TABLE I-continued

| Code | Polymer Components<br>Polymer Description |
|---|---|
| PP-2 | A polypropylene resin having a density of __ grams per cubic centimeter (ASTM Test D-792 A-2) and a melt flow rate of __ grams per ten minutes (ASTM Test D-1238). The resin was commercially available from Himont __ under the trade designation Himont PP S-B-751. |
| LLDPE | A linear low density polyethylene resin having a density of 0.920 grams per cubic centimeter (ASTM Test D-792) and a melt index of 1.0 grams per ten minutes (ASTM Test D-1238). The resin was commercially available from The Dow Chemical Company under the trade designation Dowlex ® 2045. |
| EP | An ethylene-propylene copolymer resin having a density of 0.899 grams per cubic centimeter (ASTM Test D-792A-2) and a melt flow rate of 4 grams per ten minutes (ASTM Test D-1238). The resin was commercially available from Hercules Incorporated under the trade designation Pro-Fax TM 7531. |
| EPDM | An ethylene/propylene/ethylidene norbornene terpolymer resin having a raw Mooney Viscosity (ML 1 + 4 at 125° Centigrade) of 55 and a specific gravity of 0.86. The resin was commercially available from Copolymer Rubber and Chemical Corporation under the trade designation Epsyn ® 5508 EPDM. |
| EMMA | An ethylene-methylmethacrylate copolymer resin having a polymerized methylmethacrylate content of 14.2 percent by weight of copolymer and a melt index (ASTM Test D-1238) of 3.8 grams per ten minutes. |
| EMA-1 | An ethylene/methyl acrylate copolymer resin having polymerized therein 95 percent ethylene and 5 percent methyl acrylate, both percentages being based upon copolymer weight. The copolymer was commercially available from Gulf Oil Chemical Company under the trade designation TD-1345. |
| EMA-2 | An ethylene/methyl acrylate copolymer having polymerized therein 91.9 percent ethylene and 8.1 percent methyl acrylate, both percentages being based upon copolymer weight. The copolymer had a melt index (ASTM Test D-1238) of 2.4 decigrams per minute. |
| EMA-3 | An ethylene/methyl acrylate copolymer having polymerized therein 91.1 percent ethylene and 8.9 percent methyl acrylate, both percentages being based upon copolymer weight. The copolymer had a melt index (ASTM Test D-1238) of 8.9 decigrams per minute. |
| EMA-4 | An ethylene/methyl acrylate copolymer having polymerized therein 80 percent ethylene and 20 percent methyl acrylate, both percentages being based upon copolymer weight. The copolymer had a melt index (ASTM Test D-1234) of 6.0 grams per ten minutes and density (ASTM D-1505) of 0.942 grams per cubic centimeter. The copolymer was commercially available from Gulf Oil Chemical Company under the trade designation PE 2207T. |
| EMA-5 | An ethylene/methyl acrylate copolymer having polymerized therein 80 percent ethylene and 20 percent methyl acrylate, both percentages being based upon copolymer weight. The copolymer had a melt index (ASTM Test D-1238) of 2.4 grams per ten minutes and a density (ASTM Test D-1505) of 0.942 grams per cubic centimeter. The copolymer was commercially available from Gulf Oil Chemical Company under the trade designation PE 2205. |
| EEA-1 | An ethylene/ethyl acrylate copolymer having polymerized therein 85 percent ethylene and 15 percent ethyl acrylate, both percentages being based upon copolymer weight. The copolymer had a melt index (ASTM Test D-1238) of 1.5 grams per ten minutes and a density (ASTM Test D-1505) of 0.930 grams per cubic centimeter. The copolymer was commercially available from Union Carbide under the trade designation DPDA 6182. |
| EEA-2 | An ethylene/ethyl acrylate copolymer having polymerized therein 85 percent ethylene and 15 percent ethyl acrylate, both percentages being based upon copolymer weight. The copolymer had a melt index (ASTM Test D-1238) of 6.0 grams per 10 minutes and a density (ASTM Test D-1505) of 0.931 grams per cubic centimeter. The copolymer was commercially available from Union Carbide under the trade designation EEA 6169. |
| m/EAA-1 | A 2-ethyl-2-oxazoline modified polymer of ethylene and acrylic acid. The polymer had polymerized therein ethylene in an amount of 97 percent and acrylic acid in an amount of 3 percent, both percentages being based upon polymer weight. The polymer, prior to modification, had a melt index (ASTM D-1238) of 11 grams per 10 minutes. |
| m/EAA-2 | A 2-ethyl-2-oxazoline modified polymer of ethylene and acrylic acid. The polymer had polymerized therein ethylene in an amount of 93.5 percent and acrylic acid in an amount of 6.5 percent, both percentages being based upon polymer weight. The polymer, prior to modification, had a melt index (ASTM D-1238) of 5.5 grams per 10 minutes. |
| m/EAA-3 | A 2-ethyl-2-oxazoline modified polymer of ethylene and acrylic acid. The polymer had polymerized therein ethylene in an amount of 91 percent and acrylic acid in an amount of 9 percent, both percentages being based upon polymer weight. The polymer, prior to modification, had a melt index (ASTM D-1238) of 10 grams per 10 minutes. |
| m/EAA-4 | A 2-ethyl-2-oxazoline modified polymer of ethylene and acrylic acid. The polymer had polymerized therein ethylene in an amount of 80 percent and acrylic acid in an amount of 20 percent, both percentages being based upon polymer weight. The polymer, prior to modification, had a melt index (ASTM D-1238) of 300 grams per 10 minutes. |
| EAA-1 | An ethylene/acrylic acid copolymer having polymerized therein 93.5 percent ethylene and 6.5 percent acrylic acid, both percentages being based upon copolymers weight. The copolymer had a density (ASTM Test D-792) of 0.932 grams per cubic centimeter and a melt index (ASTM Test D-1238) of 5.5 grams per ten minutes. The copolymer was commercially available from The Dow Chemical Company under the trade designation EAA Resin 455. |
| EAA-2 | An ethylene/acrylic acid copolymer having polymerized therein 91 percent ethylene and 9 percent acrylic acid, both percentages being based upon copolymers weight. The copolymer had a melt index (ASTM Test D-1238) of 10 grams per ten minutes. The copolymer was commercially available from The Dow Chemical Company under the trade designation XO 2375.43. |
| ECO-1 | An ethylene/carbon monoxide copolymer having polymerized therein 99 percent ethylene and 1 percent carbon monoxide, both percentages being based upon copolymer weight. The copolymer had a melt index (ASTM Test D-1238) of 1. |
| ECO-2 | An ethylene/carbon monoxide copolymer having polymerized therein 90 percent ethylene and 10 percent carbon monoxide, both percentages being based upon copolymer weight. The copolymer had a melt index (ASTM Test D-1238) of 1. |
| EVA-1 | An ethylene/vinyl acetate copolymer having polymerized therein 60 percent ethylene and 40 percent vinyl acetate, both percentages being based upon copolymer weight. The copolymer had a melt index (ASTM Test D-1238) of 48 to 66 grams per ten minutes and a density (ASTM Test D-1238) of 0.98 grams per cubic centimeter. |

TABLE I-continued

| Code | Polymer Components Polymer Description |
|---|---|
| | The copolymer was commercially available from E. I. duPont de Nemours & Company under the trade designation EVA-40. |
| EVA-2 | An ethylene/vinyl acetate copolymer having polymerized therein 72 percent ethylene and 28 percent vinyl acetate, both percentages being based upon copolymer weight. The copolymer had a melt index (ASTM Test D-1238) of 6.0 grams per ten minutes and a density (ASTM Test D-792) of 0.955 grams per cubic centimeter. The copolymer was commercially available from E. I. duPont de Nemours & Company under the trade designation Elvax ® 260. |
| EVA-3 | An ethylene/vinyl acetate copolymer having polymerized therein 72 percent ethylene and 28 percent vinyl acetate, both percentages being based upon copolymer weight. The copolymer had a melt index (ASTM Test D-1238) of 25 grams per ten minutes and a density (ASTM Test D-792) of 0.951 grams per cubic centimeter. The copolymer was commercially available from E. I. duPont de Nemours & Company under the trade designation Elvax ® 250. |
| EVA-4 | An ethylene/vinyl acetate copolymer having polymerized therein 82 percent ethylene and 18 percent vinyl acetate, both percentages being based upon copolymer weight. The copolymer had a melt index (ASTM Test D-1238) of 5.5 grams per ten minutes and a density (ASTM Test D-792) of 0.940 grams per cubic centimeter. The copolymer was commercially available from E. I. duPont de Nemours & Company under the trade designation EVA-3294. |
| EVA-5 | An ethylene/vinyl acetate copolymer having polymerized therein 90.5 percent ethylene and 9.5 percent vinyl acetate, both percentages being based upon copolymer weight. The copolymer had a melt index (ASTM Test D-1238) of 0.8 grams per ten minutes and a density (ASTM Test D-792) of 0.930 grams per cubic centimeter. The copolymer was commercially available from E. I. duPont de Nemours & Company under the trade designation Elvax ® 770. |
| EVA-6 | An ethylene/vinyl acetate copolymer having polymerized therein 85 percent ethylene and 15 percent vinyl acetate, both percentages being based upon copolymer weight. The copolymer had a melt index (ASTM Test D-1238) of 2.5 grams per ten minutes and a density (ASTM Test D-792) of 0.935 grams per cubic centimeter. The copolymer was commercially available from E. I. duPont de Nemours & Company under the trade designation Elvax ® 560. |
| EVA-7 | An ethylene/vinyl acetate copolymer having polymerized therein 81 percent ethylene and 19 percent vinyl acetate, both percentages being based upon copolymer weight. The copolymer had a melt index (ASTM Test D-1238) of 0.65 grams per ten minutes and a density (ASTM Test D-792) of 0.94 grams per cubic centimeter. |
| HEVA | A hydrolyzed ethylene/vinyl acetate copolymer prepared by hydrolyzing EVA-5. |
| EVA/X | An ethylene/vinyl acetate terpolymer having a melt index (ASTM Test D-1238) of 6 grams per ten minutes and a density (ASTM Test D-792) of |

TABLE I-continued

| Code | Polymer Components Polymer Description |
|---|---|
| | 0.955 grams per cubic centimeter. The terpolymer was commercially available from E. I. duPont de Nemours & Company under the trade designation CXA 1104. |
| CPE-1 | A chlorinated polyethylene polymer having a chemically combined chlorine content of 42 percent by weight of polymer, and a nominal melt viscosity of about 18,000 poise. Melt viscosity was determined using a capillary rheometer at a temperature of 190° Centigrade, a shear rate of 145 reciprocal seconds and a capillary size of .127 by 5.08 centimeters. The polymer was commercially available from The Dow Chemical Company. |
| CPE-2 | A chlorinated polyethylene polymer having a chemically combined chlorine content of 36 percent by weight of polymer, and a nominal melt viscosity of about 16,500 poise. Melt viscosity was determined using a capillary rheometer at a temperature of 190° Centigrade, a shear rate of 145 reciprocal seconds and a capillary size of .127 by 5.08 centimeters. The polymer was commercially available from The Dow Chemical Company. |
| CLLDPE | A chlorinated linear low density polyethylene polymer having a chemically combined chlorine content of 26.2 percent by weight of polymer and a nominal melt viscosity of 14,080 poise. Melt viscosity was determined using a capillary rheometer at a temperature of 190° Centigrade, a shear rate of 145 reciprocal seconds and a capillary size of .127 by 5.08 centimeters. The linear low density polyethylene polymer had a melt index (ASTM D-1238) of 2.5 grams per ten minutes. The nonchlorinated polymer was commercially available from The Dow Chemical Company under the trade designation Dowlex = 2037. |
| CPP | A chlorinated polypropylene polymer having a chemically combined chlorine content of 7.5 percent by weight of polymer. The polypropylene, prior to chlorination, had a density of 0.902 grams per cubic centimeter (ASTM Test D-792 A-2) and a melt flow rate of 0.4 grams per ten minutes (ASTM Test D-1238). The nonchlorinated polypropylene was commercially available from Hercules, Incorporated under the trade designation Pro-Fax ™ 6301. |

Various combinations of the polymer components set forth in Table I were prepared as hereinbefore specified. Impact test and permeability test specimens were prepared, also as hereinbefore specified, and subjected to physical property testing.

Results of the physical property tests, where available, are set forth hereinafter together with identity and amount of polymer components of each of the respective combinations. Examples of the present invention are represented by Arabic numerals Comparative Examples, which are not representative of the present invention, are represented by alphabetic characters.

TABLE IIA

BLENDS OF LOW DENSITY POLYETHYLENE AND A VINYLIDENE CHLORIDE INTERPOLYMER

| Example/ Comparative Example | Polymer Code | Component Amount* | Extruder | Impact Energy (Joules) | Oxygen Permeability*** |
|---|---|---|---|---|---|
| A | VDC-1 | 75 | A | 0.12 | 66 |
| | LDPE | 25 | | | |
| 1 | VDC-1 | 75 | A | 3.62 | 0.9 |
| | LDPE | 25 | | | |
| | EMA-4 | 10** | | | |
| 2 | VDC-1 | 25 | A | 4.29 | 283 |

TABLE IIA-continued
BLENDS OF LOW DENSITY POLYETHYLENE AND A VINYLIDENE CHLORIDE INTERPOLYMER

| Example/Comparative Example | Polymer Code | Component Amount* | Extruder | Impact Energy (Joules) | Oxygen Permeability*** |
|---|---|---|---|---|---|
| | LDPE | 75 | | | |
| | EMA-4 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) the atmospheric pressure in atmospheres.

The data presented in Table IIA discloses several points of interest. First, a simple two-component blend (Comparative Example A) has very low impact energy and poor barrier to oxygen. Second, addition of a compatibilizing amount of a third polymer component to the two-component blend, as in Example 1, produces dramatic improvements in both impact energy and oxygen permeability. Third, by varying the ratio of olefin polymer to vinylidene chloride interpolymer, as in Example 2, oxygen permeability can be varied without significant effect upon impact energy of the three component blend.

Similar results are obtained with other three-component blends using other vinylidene chloride interpolymer resins and compatibilizing polymer resins, both of which are described hereinabove. Similar results are also obtained with other olefin polymers. Variations in each of the components are shown in Tables IIB through IIK which follow.

TABLE IIB
BLENDS OF HIGH DENSITY POLYETHYLENE AND A VINYLIDENE CHLORIDE INTERPOLYMER

| Example/Comparative Example | Polymer Code | Component Amount* | Extruder | Impact Energy (Joules) | Oxygen Permeability*** |
|---|---|---|---|---|---|
| B | VDC-1 | 65 | B | 0.12 | — |
| | HDPE | 35 | | | |
| 3 | VDC-1 | 75 | B | 3.95 | 1.0 |
| | HDPE | 25 | | | |
| | EMA-4 | 10** | | | |
| 4 | VDC-1 | 25 | B | 5.65 | — |
| | HDPE | 75 | | | |
| | EMA-4 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
— Not measured.

The data presented in Table IIB shows that results similar to those presented in Table IIA were obtained when the olefin polymer was high density polyethylene rather than low density polyethylene.

TABLE IIC
BLENDS OF OTHER OLEFIN POLYMERS AND A VINYLIDENE CHLORIDE INTERPOLYMER

| Example/Comparative Example | Polymer Code | Component Amount* | Extruder | Impact Energy (Joules) | Oxygen Permeability*** |
|---|---|---|---|---|---|
| 5 | VDC-1 | 67 | B | 1.81 | 2.0 |
| | PP | 22 | | | |
| | EMA-4 | 11 | | | |
| 6 | VDC-1 | 64 | B | 1.69 | — |
| | PB | 26 | | | |
| | EMA-4 | 10 | | | |
| 7 | VDC-1 | 67 | B | 7.91 | 1.0 |
| | LLDPE | 27 | | | |
| | EMA-4 | 6 | | | |
| 8 | VDC-1 | 30 | B | 3.17 | — |
| | LLDPE | 70 | | | |
| | EMA-4 | 10** | | | |
| 9 | VDC-1 | 67 | B | 4.29 | 1.0 |
| | EP | 27 | | | |
| | EMA-4 | 6 | | | |
| 10 | VDC-1 | 30 | B | 10.73 | 190 |
| | EP | 70 | | | |
| | EMA-4 | 10** | | | |
| C | VDC-1 | 65 | B | 0.12 | — |
| | EPDM | 35 | | | |
| 11 | VDC-1 | 90 | B | 4.52 | — |
| | EPDM | 10 | | | |
| | EMA-4 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
—Not measured.

The data presented in Table IIC shows that results similar to those presented in Table IIA were obtained with a variety of olefin polymers, all of which are described hereinabove.

TABLE IID
BLENDS OF LOW DENSITY POLYETHYLENE, A VINYLIDENE CHLORIDE INTERPOLYMER AND AN ACRYLATE OR METHACRYLATE COPOLYMER

| Example/Comparative Example | Polymer Code | Component Amount* | Extruder | Impact Energy (Joules) | Oxygen Permeability*** |
|---|---|---|---|---|---|
| 12 | VDC-1 | 75 | A | 2.71 | 0.9 |
| | LDPE | 25 | | | |
| | EMMA | 10** | | | |
| 13 | VDC-1 | 75 | A | 1.81 | — |
| | LDPE | 25 | | | |

TABLE IID-continued
BLENDS OF LOW DENSITY POLYETHYLENE, A VINYLIDENE CHLORIDE INTERPOLYMER AND AN ACRYLATE OR METHACRYLATE COPOLYMER

| Example/ Comparative Example | Polymer Code | Component Amount* | Extruder | Impact Energy (Joules) | Oxygen Permeability*** |
|---|---|---|---|---|---|
| | EMA-1 | 10** | | | |
| 14 | VDC-1 | 75 | A | 2.83 | 1.0 |
| | LDPE | 25 | | | |
| | EMA-2 | 10** | | | |
| 15 | VDC-1 | 75 | A | 3.39 | 0.9 |
| | LDPE | 25 | | | |
| | EMA-3 | 10** | | | |
| 16 | VDC-1 | 75 | A | 2.48 | 1.1 |
| | LDPE | 25 | | | |
| | EMA-4 | 10** | | | |
| 17 | VDC-1 | 75 | A | 2.94 | 0.8 |
| | LDPE | 25 | | | |
| | EMA-5 | 10** | | | |
| 18 | VDC-1 | 75 | A | 2.15 | 1.3 |
| | LDPE | 25 | | | |
| | EEA-1 | 10** | | | |
| 19 | VDC-1 | 75 | A | 4.86 | — |
| | LDPE | 25 | | | |
| | EEA-2 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
—Not measured.

The data presented in Table IID shows that a variety of compatibilizing polymers were suitable for use in preparing the compatibilized blends of the present invention.

TABLE IIE
BLENDS OF LOW DENSITY POLYETHYLENE, A VINYLIDENE CHLORIDE INTERPOLYMER AND AN ETHYL OXAZOLINE MODIFIED COPOLYMER OF ETHYLENE AND ACRYLIC ACID

| Example/ Comparative Example | Polymer Code | Component Amount* | Extruder | Percent Acrylic Acid**** | Impact Energy (Joules) | Oxygen Permeability*** |
|---|---|---|---|---|---|---|
| D | VDC-1 | 75 | A | | 0.34 | — |
| | LDPE | 25 | | | | |
| | m/EAA-1 | 10** | | 3 | | |
| 20 | VDC-1 | 75 | A | | 1.36 | 0.7 |
| | PB | 25 | | | | |
| | m/EAA-2 | 10** | | 6.5 | | |
| 21 | VDC-1 | 75 | A | | 1.81 | — |
| | LDPE | 25 | | | | |
| | m/EAA-3 | 10** | | 9 | | |
| E | VDC-1 | 50 | A | | 0.12 | — |
| | LDPE | 50 | | | | |
| | m/EAA-4 | 10** | | 20 | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table IIE shows that another group of compatibilizing polymers, the ethyloxazoline-modified ethylene/acrylic acid polymers, also produced satisfactory results provided two conditions are met. First, the polymer, prior to modification must have a polymerized acrylic acid content which is greater than 3 percent but less than 20 percent by weight of polymer. Second, a ratio of vinylidene chloride polymer to low density polyethylene of greater than 1:1 is necessary.

TABLE IIF
BLEND OF LOW DENSITY POLYETHYLENE, A VINYLIDENE CHLORIDE INTERPOLYMER AND AN ETHYLENE/ACRYLIC ACID COPOLYMER

| Example/ Comparative Example | Polymer Code | Component Amount* | Extruder | Percent Acrylic Acid**** | Impact Energy (Joules) | Oxygen Permeability*** |
|---|---|---|---|---|---|---|
| F | VDC-1 | 75 | A | | 0.23 | — |
| | LDPE | 25 | | | | |
| | EAA-1 | 10** | | 6.5 | | |
| G | VDC-1 | 75 | A | | 0.12 | — |
| | LDPE | 25 | | | | |
| | EAA-2 | 10** | | 9 | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table IIF amply demonstrates that unmodified ethylene/acrylic acid copolymers were not effective compatibilizers (Comparative Examples F and G). By way of contrast, the same copolymers, when modified by ethyloxazoline, were effective compatibilizers (Examples 20 and 21, Table IIE).

TABLE II-G
BLEND OF LOW DENSITY POLYETHYLENE, A VINYLIDENE CHLORIDE INTERPOLYMER AND AN ETHYLENE/CARBON MONOXIDE COPOLYMER

| Example/ Comparative Example | Polymer Code | Component Amount* | Extruder | Impact Energy (Joules) | Oxygen Permeability*** |
|---|---|---|---|---|---|
| 22 | VDC-1 | 75 | A | 0.23 | — |
| | LDPE | 25 | | | |
| | ECO-1 | 10** | | | |

TABLE II-G-continued
BLEND OF LOW DENSITY POLYETHYLENE, A VINYLIDENE CHLORIDE INTERPOLYMER AND AN ETHYLENE/CARBON MONOXIDE COPOLYMER

| Example/ Comparative Example | Polymer Code | Component Amount* | Extruder | Impact Energy (Joules) | Oxygen Permeability*** |
|---|---|---|---|---|---|
| 23 | VDC-1 | 75 | A | 1.13 | — |
|    | LDPE | 25 | | | |
|    | ECO-2 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table II-G demonstrates that ethylene/carbon monoxide copolymers are effective compatibilizers provided the copolymer has polymerized therein a sufficient amount of carbon monoxide. It is clear that a carbon monoxide content of one percent is inadequate and that a carbon monoxide content of ten percent provides satisfactory results. Similar results are obtained with other ethylene/carbon monoxide copolymers having a sufficient polymerized carbon monoxide content.

TABLE II-H
BLEND OF LOW DENSITY POLYETHYLENE, A VINYLIDENE CHLORIDE INTERPOLYMER AND AN ETHYLENE/VINYL ACETATE COPOLYMER

| Example/ Comparative Example | Polymer Code | Component Amount* | Extruder | Impact Energy (Joules) | Oxygen Permeability*** |
|---|---|---|---|---|---|
| I  | VDC-1 | 75 | A | 0.12 | — |
|    | LDPE | 25 | | | |
|    | EVA-1 | 10** | | | |
| J  | VDC-1 | 75 | A | 1.12 | — |
|    | LDPE | 25 | | | |
|    | EVA-2 | 10** | | | |
| 24 | VDC-1 | 50 | A | 2.15 | — |
|    | LDPE | 50 | | | |
|    | EVA-3 | 10** | | | |
| 25 | VDC-1 | 50 | A | 1.92 | — |
|    | LDPE | 50 | | | |
|    | EVA-4 | 10** | | | |
| 26 | VDC-1 | 75 | A | 0.90 | 1.1 |
|    | LDPE | 25 | | | |
|    | EVA-4 | 10** | | | |
| K  | VDC-1 | 75 | A | 0.12 | — |
|    | LDPE | 25 | | | |
|    | EVA-5 | 10** | | | |
| L  | VDC-1 | 75 | A | 0.12 | — |
|    | LDPE | 25 | | | |
|    | EVA-6 | 10** | | | |
| 27 | VDC-1 | 75 | A | 2.72 | — |
|    | LDPE | 25 | | | |
|    | EVA-7 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table II-H shows that several interrelated factors must be considered in selecting an ethylene/vinyl acetate copolymer as a compatibilizing polymer. One factor is ratio of vinylidene chloride interpolymer to olefin polymer. A second factor is melt index of the ethylene/vinyl acetate polymer in comparison with that of the olefin polymer. A third factor is the polymerized vinyl acetate content of the ethylene/vinyl acetate polymer.

A comparison of Example 25 with Example 26 indicates that as the ratio of vinylidene chloride interpolymer to olefin polymer decreases, impact energy of the compatibilized blend increases. In Example 25, the ratio is 1:1 and the impact energy is 1.92 Joules whereas in Example 26, the ratio is 3:1 and the impact energy is 0.90 Joules.

A comparison of Comparative Example L with Example 26 indicates that impact energy measurements are higher when the melt index of the ethylene/vinyl acetate polymer is lower than that of the olefin polymer than when it is higher. In Comparative Example L, the melt index was 2.5 grams per 10 minutes. In Example 26, the melt index was 0.65 grams per 10 minutes. That of the olefin polymer was 2.0 grams per 10 minutes.

A comparison of Example 25 with Comparative Example K, indicates that impact energy measurements increase with increasing polymerized vinyl acetate content in the ethylene/vinyl acetate polymer. In Example 25, the ethylene vinyl acetate copolymer had a polymerized vinyl acetate content of 18 percent by weight of polymer. In Comparative Example K, the ethylene vinyl acetate copolymer had a polymerized vinyl acetate content of 9.5 percent by weight of polymer.

TABLE II-I
BLENDS OF HIGH DENSITY POLYETHYLENE, A VINYLIDENE CHLORIDE INTERPOLYMER AND AN ETHYLENE/VINYL ACETATE CONTAINING TERPOLYMER OR A MODIFIED ETHYLENE/VINYL ACETATE COPOLYMER

| Example/ Comparative Example | Polymer Code | Component Amount* | Extruder | Impact Energy (Joules) | Oxygen Permeability*** |
|---|---|---|---|---|---|
| 28 | VDC-1 | 67 | B | 5.43 | — |
|    | HDPE | 22 | | | |
|    | HEVA | 11 | | | |
| 29 | VDC-1 | 75 | B | 1.36 | — |
|    | HDPE | 25 | | | |
|    | EVA/X | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table II-I shows that a hydrolyzed ethylene/vinyl acetate copolymer (Example 27) and an ethylene/vinyl acetate terpolymer (Example 28) were also effective as compatibilizers.

TABLE II-J
BLENDS OF AN OLEFIN POLYMER, A VINYLIDENE CHLORIDE INTERPOLYMER AND A CHLORINATED COMPATIBILIZING POLYMER

| Example/ Comparative Example | Polymer Code | Component Amount* | Extruder | Impact Energy (Joules) | Oxygen Permeability*** |
|---|---|---|---|---|---|
| 30 | VDC-1 | 75 | B | 2.15 | 1.0 |
|    | HDPE | 25 | | | |
|    | CPE-1 | 10** | | | |
| 31 | VDC-1 | 75 | B | 0.68 | — |
|    | HDPE | 25 | | | |
|    | EVA/X | 10** | | | |
| 32 | VDC-1 | 75 | B | 12.20 | 1.3 |
|    | LLDPE | 25 | | | |
|    | CLLDPE | 10** | | | |
| 33 | VDC-1 | 67 | B | 1.13 | — |
|    | PP | 22 | | | |

TABLE II-J-continued
BLENDS OF AN OLEFIN POLYMER, A VINYLIDENE CHLORIDE INTERPOLYMER AND A CHLORINATED COMPATIBILIZING POLYMER

| Example/ Comparative Example | Polymer Code | Component Amount* | Extruder | Impact Energy (Joules) | Oxygen Permeability*** |
|---|---|---|---|---|---|
| | CPP | 11 | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table II-J demonstrates that a variety of halogenated olefin polymers were also effective as compatibilizers.

TABLE II-K
THREE-COMPONENT BLENDS CONTAINING DIFFERENT VINYLIDENE CHLORIDE COPOLYMERS

| Example/ Comparative Example | Polymer Code | Component Amount* | Extruder | Impact Energy (Joules) | Oxygen Permeability*** |
|---|---|---|---|---|---|
| 1 | VDC-1 | 75 | A | 3.62 | 0.9 |
| | LDPE | 25 | | | |
| | EMA-4 | 10** | | | |
| 34 | VDC-2 | 75 | A | 3.96 | 0.85 |
| | LDPE | 25 | | | |
| | EMA-4 | 10** | | | |
| 35 | VDC-3 | 75 | A | 0.68 | 0.92 |
| | LDPE | 25 | | | |
| | EMA-4 | 10** | | | |
| M | VDC-4 | 75 | A | 0.12 | 0.47 |
| | LDPE | 25 | | | |
| | EMA-4 | 10** | | | |
| 36 | VDC-5 | 75 | A | 2.26 | 1.6 |
| | LDPE | 25 | | | |
| | EMA-4 | 10** | | | |
| 37 | VDC-6 | 75 | A | 0.79 | 1.1 |
| | LDPE | 25 | | | |
| | EMA-4 | 10** | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.
****Based upon weight of ethylene/acrylic acid copolymer.
—Not measured.

The data presented in Table II-K shows that a variety of vinylidene chloride copolymers produced compatible blends of the present invention. The three-component blend of Comparative Example M produced unsatisfactory results. It is believed that the blend of Comparative Example M was unsatisfactory because the melt viscosity of the vinylidene chloride copolymer was too low in comparison to that of the ethylene/methyl acrylate copolymer and the low density polyethylene. As noted hereinabove, achieving a visually homogeneous melt becomes more difficult as disparity of melt viscosity increases.

A review of the physical property data of the blends set forth in Table IIA-IIK brings out several points.

First, a binary blend of an olefin polymer and a vinylidene chloride interpolymer has low impact energy and high permeability to oxygen (Comparative Examples A, B and C). A ternary blend of an olefin polymer, a vinylidene chloride interpolymer and a compatibilizing amount of at least one other polymer selected form the polymers hereinbefore identified has much higher impact energy (Examples 1 and 2). In addition, the ternary blend has, depending upon relative proportions of olefin polymer and vinylidene chloride interpolymer either low permeability to oxygen (Example 1) or high permeability to oxygen (Example 2).

Second, a variety of olefin polymers may be used in conjunction with a vinylidene chloride interpolymer and a compatibilizing amount of at least one other polymer. See, Examples 3, 5-7, 9, 11.

Third, a variety of polymers are suitable for use as compatibilizing polymers. See, Examples 1, and 12—32.

Similar results are obtained with other compatibilized blends prepared as hereinbefore specified using polymer components, also as hereinbefore specified.

The data presented in Table II-L shows the use of various combinations of the polymer components set forth in Table I, which are compatibilized with compatabilizing amounts of graft copolymers.

The results of the physical property testing are set forth in Table II-L.

TABLE II-L
BLENDS OF OLEFIN POLYMERS, A VINYLIDENE CHLORIDE INTERPOLYMER AND A GRAFT COMPATIBILIZING POLYMER

| Sample No. | Polymer Code | Component Amount* | Extruder | Impact Energy (Joules) | Oxygen Permeability*** |
|---|---|---|---|---|---|
| 38 | VDC-8 | 68 | B | | |
| | PVDC/LDPE | 9 | | 3.39 | 0.27 |
| | LDPE | 23 | | | |
| 39 | VDC-8 | 62 | B | | |
| | PVDC/LDPE | 18 | | 4.63 | 0.33 |
| | LDPE | 20 | | | |
| 40 | VDC-8 | 56 | B | | |
| | PVDC/LDPE | 27 | | 5.82 | 0.33 |
| | LDPE | 17 | | | |
| 41 | VDC-8 | 68 | B | | |
| | PVDC/LDPE | 9 | | 3.23 | 0.25 |
| | LDPE | 23 | | | |
| 42 | VDC-8 | 62 | B | | |
| | PVDC/LDPE | 18 | | 4.78 | 0.29 |
| | LDPE | 20 | | | |
| 43 | VDC-8 | 56 | B | | |
| | PVDC/LDPE | 27 | | 6.05 | 0.30 |
| | LDPE | 17 | | | |

*Amounts are in percentages based upon weight of blend unless indicated by **.
**Amounts are based upon parts per hundred parts of other polymer components.
***Cubic centimeters of oxygen times mils of thickness divided by the product of (a) 100, (b) area in square inches, (c) 24 hours and (d) atmospheric pressure in atmospheres.

The data presented in Table II-L shows that graft copolymers of a polyvinylidene chloride interpolymer and a low density polyethylene are also effective as compatibilizers.

Similar results are obtained with other compatibilized blends prepared as hereinbefore specified using polymer components, also as hereinbefore specified.

What is claimed is:

1. A compatibilized blend of polymers comprising: (a) at least about 45 weight percent of a vinylidene chloride interpolymer having between 5 and 95 percent crystallinity as measured by the density method and having polymerized therein vinylidene chloride in an amount of from about 72 to about 98 percent by weight of interpolymer and at least one monoethylenically unsaturated monomer copolymerizable therewith in an amount of from about 28 to about 2 percent by weight of interpolymer; (b) at least about 9 weight percent of an olefin polymer and (c) a compatibilizing amount between about 4 and about 20 weight percent of a compatibilizing polymer, said compatibilizing polymer being selected from the group consisting of:

(1) a copolymer of between about 80 to 95 weight percent ethylene and between about 5 to 20 weight percent esters of acrylic or methacrylic acid with 1 to 8 carbon alkyl groups;

(2) a copolymer of between about 90 to 99 weight percent ethylene and about 1 to 10 weight percent carbon monoxide;

(3) a copolymer of between about 72 to 82 percent weight ethylene and between about 18 to 28 weight percent vinyl acetate; and (4) a copolymer of between about 91 to 93 weight percent ethylene and between about 7 to 9 weight percent acrylic acid, modified by reaction with ethyl oxazoline.

2. The compatibilized blend of claim 1 wherein the vinylidene chloride interpolymer is an interpolymer of vinylidene chloride and a monomer selected from the group consisting of vinyl chloride, alkyl acrylates, alkyl methacrylates, acrylic acid, methacrylic acid, itaconic acid, acrylonitrile and methacrylonitrile.

3. The compatibilized blend of claim 2 wherein the vinylidene chloride interpolymer is an interpolymer of vinylidene chloride and an alkyl acrylate, the alkyl acrylate having from about 1 to about 8 carbon atoms per alkyl group.

4. The compatibilized blend of claim 3 wherein the vinylidene chloride interpolymer is an interpolymer of vinylidene chloride and methyl acrylate or ethyl acrylate.

5. The compatibilized blend of claim 3 wherein the amount of alkyl acrylate in the vinylidene chloride interpolymer is about 6 percent by weight of interpolymer and the amount of vinylidene chloride is about 94 percent by weight of interpolymer.

6. The compatibilized blend of claim 2 wherein the vinylidene chloride interpolymer is an interpolymer of vinylidene chloride and vinyl chloride.

7. The compatibilized blend of claim 6 wherein the amount of vinyl chloride in the vinylidene chloride interpolymer is from about 19 to about 28 percent by weight of interpolymer and the amount of vinylidene chloride in the vinylidene chloride interpolymer is from about 85 to about 72 percent by weight of interpolymer.

8. The compatibilized blend of claim 1 wherein the olefin polymers of (b) are selected from the group consisting of (1) low density polyethylene; (2) medium density polyethylene, (3) high density polyethylene, (4) polypropylene, (5) poly-1-butene, (6) generally linear interpolymers of ethylene having polymerized therein from about 2 to about 98 weight percent of ethylene and from about 98 to about 2 weight percent of at least one 1-alkene, said alkene having from 3 to 18 carbon atoms, (7) interpolymers of two or more alpha-olefins having from 3 to about 18 carbon atoms per molecule, and (8) rubbery ethylene-propylene-diene monomer interpolymers, and mixtures thereof.

9. The compatibilized blend of claim 1 wherein the olefin polymer is present in an amount no greater than 46 weight percent, based on the weight of the blend.

10. The compatibilized blend of claim 9 containing no more than about 30 weight percent olefin polymer and at least about 64 weight percent vinylidene chloride interpolymer.

11. The compatibilized blend of claim 10 wherein the compatibilizing polymer is present in an amount of between about 12 to about 6 weight percent, based on the weight of the blend.

12. The compatibilized blend of claim 8 wherein the olefin polymer of (b) is low density polyethylene, the low density polyethylene having a density of from about 0.917 to about 0.929 grams per cubic centimeter and a melt index, measured in accordance with American Society for Testing and Materials Test D-1238, of from about 0.1 to about 20 grams per 10 minutes.

13. The compatibilized blend of claim 8 wherein the olefin polymer of (b) is medium density polyethylene, the medium density polyethylene having a density of from about 0.930 to about 0.939 grams per cubic centimeter and a melt index, measured in accordance with American Society for Testing and Materials Test D-1238, of from about 0.08 to about 100 grams per 10 minutes.

14. The compatibilized blend of claim 8 wherein the olefin polymer of (b) is high density polyethylene, the high density polyethylene having a density of from about 0.940 to about 0.965 grams per cubic centimeter and a melt index, measured in accordance with American Society for Testing and Materials Test D-1238, of from about 0.08 to about 100 grams per 10 minutes.

15. The compatibilized blend of claim 8 wherein the olefin polymer of (b) is a linear copolymer of ethylene and at least one 1-alkene, the copolymer having polymerized therein ethylene in an amount of from about 80 to about 98 percent by weight of copolymer and one or more 1-alkenes in a total amount of from about 20 to about 2 percent by weight of copolymer.

16. The compatibilized blend of claim 15 wherein the 1-alkene in the olefin polymer is selected from the group of 1-alkenes which have from about 4 to about 10 carbon atoms per molecules.

17. The compatibilized blend of claim 8 wherein the olefin polymer of (b) is a copolymer of ethylene and at least one monomer copolymerizable therewith, the monomer being selected from the group consisting of alpha-olefin monomers having from about 3 to about 18 carbons atoms per molecule.

18. The compatibilized blend of claim 17 wherein the olefin polymer has polymerized therein ethylene in an amount of from about 80 to about 98 percent by weight of polymer and propylene in an amount of from about 20 to about 2 percent by weight of polymer.

19. The compatibilized blend of claim 1 wherein the compatibilizing polymer is a copolymer of of ethylene and an ester of acrylic or methacrylic acid.

20. The compatibilized blend of claim 1 wherein the compatibilizing polymer is a copolymer of ethylene and carbon monoxide.

21. The compatibilized blend of claim 1 wherein the compatibilizing polymer is a copolymer of ethylene and vinyl acetate.

22. The compatibilized blend of claim 1 wherein the compatibilizing polymer is a copolymer of ethylene and acrylic acid, said copolymer being modified with ethyl oxazoline.

23. The compatibilized blend of claim 1 wherein said compatible blend has an impact energy which is greater than the impact energy of a blend of the vinylidene chloride interpolymer and the olefin polymer.

24. The compatibilized blend of claim 23 wherein the blend, after melt processing, has an impact energy of at least 6.8 Joules.

25. A compatibilized blend of claim 1 which has an oxygen permeability index of no more than about 2 Dow Units.

26. An improved process for preparing a vinylidene chloride polyolefin-blend, said process comprising blending (a) at least about 45 weight percent of a vinylidene chloride interpolymer having a crystallinity between about 5 and 95 percent and having polymerized therein vinylidene chloride in an amount of from about 72 to about 98 percent by weight of interpolymer and at least one monoethylenically unsaturated monomer copolymerizable therewith in an amount of from about 28 to about 2 percent by weight of interpolymer;

(b) at least about 9 weight percent of an olefin polymer and (c) a compatibilizing amount, between about 4 and about 20 weight percent, of a compatibilizing polymer, said compatibilizing polymer being selected from the group consisting of:

(1) a copolymer of between about 80 to 95 weight percent ethylene and between about 5 to 20 weight percent esters of acrylic or methacrylic acid with 1 to 8 carbon alkyl groups;

(2) a copolymer of between about 90 to 99 weight percent ethylene and about 1 to 10 weight percent carbon monoxide;

(3) a copolymer of between about 72 to 82 percent weight ethylene and between about 18 to 28 weight percent vinyl acetate; and (4) a copolymer of between about 91 to 93 weight percent ethylene and between about 7 to 9 weight percent acrylic acid, modified by reaction with ethyl oxazoline, at sufficiently high temperature and high shear and for a length of time sufficient to form an essentially homogeneous compatibilized mixture.

27. The process of claim 26 further comprising the step of casting, extruding, injection molding, blow molding or calendering the vinyhlidene chloride polyolefin blend to form a shaped article.

28. An article prepared by the process of claim 27.

29. The process of claim 26 wherein the compatibilizing polymer is a copolymer of ethylene and an ester of acrylic or methacrylic acid.

30. The process of claim 29 wherein alkyl groups in the ester of the compatibilizing polymer contain from 1 to 4 carbon atoms.

31. The process of claim 30 wherein the alkyl group in the ester of the compatibilizing polymer is a methyl or ethyl group.

32. The process of claim 26 wherein the compatibilizing polymer is a copolymer of ethylene and carbon monoxide.

33. The process of claim 26 wherein the compatibilizing polymer is a copolymer of ethylene and vinyl acetate.

34. The process of claim 26 wherein the compatibilizing polymer is a copolymer of ethylene and acrylic acid, said copolymer being modified with ethyl oxazoline.

35. The process of claim 34 wherein the compatibilizing polymer is produced by reacting the ethylene-acrylic acid copolymer with excess ethyl oxazoline at a temperature between about 110° C. and 120° C. for 2 to 24 hours.

36. The process of claim 26 wherein the vinylidene chloride interpolymer is at least about 64 weight percent of the homogeneous compatibilized mixture, and the compatibilizing polymer is from about 6 to about 12 weight percent of the homogeneous compatibilized mixture.

37. The process of claim 36 wherein the compatibilizing polymer is from about 8 to about 10 weight percent of the homogeneous compatibilized mixture.

38. The compatibilized blend of claim 19 wherein alkyl groups in the ester of the compatibilizing polymer contain from 1 to 4 carbon atoms.

39. The compatibilized blend of claim 19 wherein the alkyl group in the ester of the compatibilizing polymer is a methyl or ethyl group.

40. The compatibilized blend of claim 22 wherein the compatibilizing polymer is produced by reacting the ethylene-acrylic acid copolymer with excess ethyl oxazoline at a temperature between about 110° C. and 120° C. for 2 to 24 hours.

41. The compatibilized blend of claim 1 containing at least about 64 weight percent vinylidene chloride interpolymer, and from about 6 to about 12 weight percent compatibilizing polymer.

42. The compatibilized blend of claim 1 containing from about 8 to about 10 weight percent compatibilizing polymer.

43. The compatibilized blend of claim 1 which is visually homogeneous.

* * * * *

UNITED STATES PATENT AND TRADEMARK OFFICE
CERTIFICATE OF CORRECTION

PATENT NO. : 4,950,718

DATED : August 21, 1990

INVENTOR(S) : Bill E. Burgert and Dan E. Ranck

It is certified that error appears in the above-identified patent and that said Letters Patent is hereby corrected as shown below:

Column 1, line 8, " 1987: " the correct punctuation should read as -- 1987; --.

Column 2, line 26, " polymer: (b) " the correct punctuation should read as -- polymer; (b) --.

Column 4, line 66, " Pat. Nos. 3,957,919: 3,657,395: " the correct punctuation should read as -- Pat. Nos. 3,957,919; 3,657,395; --.

Column 5, line 3, " 1,4hexadiene " should correctly read -- 1,4-hexadiene --.

Column 5, line 24, " therewith: (ii) " the correct punctuation should read as -- therewith; (ii) --.

Column 5, line 64, " international units: " the correct punctuation should read as -- international units; --.

Column 6, line 55, " thereof: (b) " the correct punctuation should read as -- thereof; (b) --.

Column 6, line 57, " methacrylate: (d) " the correct punctuation should read as -- methacrylate; (d) --.

Column 6, line 58, " carbon monoxide: (e) " the correct punctuation should read as -- carbon monoxide; (e) --.

Column 6, line 60, " vinyl acetate: (f) " the correct punctuation should read as -- vinyl acetate; (f) --.

UNITED STATES PATENT AND TRADEMARK OFFICE
CERTIFICATE OF CORRECTION

PATENT NO. : 4,950,718

DATED : August 21, 1990

INVENTOR(S) : Bill E. Burgert and Dan E. Ranck

It is certified that error appears in the above-identified patent and that said Letters Patent is hereby corrected as shown below:

Column 6, line 61, " vinyl acetate: (g) " the correct punctuation should read as -- vinyl acetate; (g) --.

Column 6, line 62, " acrylic acid: (h) " the correct punctuation should read as -- acrylic acid; (h) --.

Column 6, line 64, " acid: (i) " the correct punctuation should read -- acid; (i) --.

Column 6, line 65, " methacrylic acid: and " the correct punctuation should read -- methacrylic acid; and --.

Column 7, line 17, " carbon atoms: and " the correct punctuation should read -- carbon atoms; and --.

Column 7, line 42, " 4,024,325: " the correct punctuation should read -- 4,024,325; --.

Column 7, line 43, " 4,024,326: " the correct punctuation should read -- 4,024,326; --.

Column 7, line 52, " vinyl acetate: " the correct punctuation should read -- vinyl acetate; --.

Column 7, line 53, " acrylic acid: " the correct punctuation should read as -- acrylic acid; --.

Column 7, line 55, " vinyl acetate: " the correct punctuation should read as -- vinyl acetate; --.

UNITED STATES PATENT AND TRADEMARK OFFICE
CERTIFICATE OF CORRECTION

PATENT NO. : 4,950,718

DATED : August 21, 1990

INVENTOR(S) : Bill E. Burgert and Dan E. Ranck

It is certified that error appears in the above-identified patent and that said Letters Patent is hereby corrected as shown below:

Column 8, line 68, " the method comprising (A) " the correct punctuation should read as -- the method comprising: (A) --.

Column 9, line 14, " polyolefin: and " the correct punctuation should read as -- polyolefin; and --.

Column 11, line 16, " Centigrade: (b) " the correct punctuation should read as -- Centigrade; (b) --.

Column 11, line 17, " Centigrade: and " the correct punctuation should read as -- Centigrade; and --.

Column 11, line 22, " Centigrade: (b) " the correct punctuation should read as -- Centigrade; (b) --.

Column 11, line 23, " Centigrade: and " the correct punctuation should read as -- Centigrade; and --.

Column 18, line 55, " numerals Comparative " the correct punctuation should read as -- numerals. Comparative --.

Column 20, in TABLE IIC-continued, line 21, under the sub-heading of Example/Comparative Example, please add the number -- 9 --. Line 21 of the table should correctly read as follows:

-- 9    VDC-1    67    B    4.29    1.0 --.

UNITED STATES PATENT AND TRADEMARK OFFICE
CERTIFICATE OF CORRECTION

PATENT NO. : 4,950,718

DATED : August 21, 1990

INVENTOR(S) : Bill E. Burgert and Dan E. Ranck

It is certified that error appears in the above-identified patent and that said Letters Patent is hereby corrected as shown below:

Column 23, in TABLE II-H, line 37, under the sub-heading Impact Energy (Joules), " 1.12 " should correctly read -- 0.12 --.

Column 27, Claim 7, line 38, " is from about 19 to " should correctly read -- is from about 15 to --.

Column 29, Claim 27, line 37, " casting, extruding, injection molding, " should correctly read -- casting, extruding injection molding, --.

Signed and Sealed this

Eighteenth Day of May, 1993

Attest:

MICHAEL K. KIRK

*Attesting Officer*     *Acting Commissioner of Patents and Trademarks*